(12) United States Patent
Taylor et al.

(10) Patent No.: US 6,544,934 B2
(45) Date of Patent: Apr. 8, 2003

(54) METHODS AND COMPOSITIONS FOR TREATING SUBTERRANEAN FORMATIONS WITH GELLED HYDROCARBON FLUIDS

(75) Inventors: Robert S. Taylor, Duncan, OK (US); Gary P. Funkhouser, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 57 days.

(21) Appl. No.: 09/792,165

(22) Filed: Feb. 23, 2001

(65) Prior Publication Data

US 2002/0160921 A1 Oct. 31, 2002

(51) Int. Cl.⁷ .................................................. C09K 3/00
(52) U.S. Cl. .................... 507/238; 507/271; 507/902; 507/921; 507/922; 516/104
(58) Field of Search ................. 507/238, 271, 507/902, 922, 921; 166/308; 516/104

(56) References Cited

U.S. PATENT DOCUMENTS

| | | | | |
|---|---|---|---|---|
| 3,798,162 A | | 3/1974 | Dickert, Jr. et al. | 252/32.5 |
| 3,900,070 A | | 8/1975 | Chatterji et al. | 166/308 |
| 3,990,978 A | | 11/1976 | Hill | 252/8.55 R |
| 4,007,128 A | | 2/1977 | Poklacki | 252/316 |
| 4,104,173 A | | 8/1978 | Gay et al. | 252/8.55 R |
| 4,153,649 A | | 5/1979 | Griffin, Jr. | 260/950 |
| 4,200,540 A | | 4/1980 | Burnham | 252/8.55 R |
| 4,382,003 A | | 5/1983 | Kucera et al. | 252/8.55 R |
| 4,622,155 A | | 11/1986 | Harris et al. | 252/8.551 |
| 4,741,401 A | | 5/1988 | Walles et al. | 166/300 |
| 4,787,994 A | | 11/1988 | Thorne et al. | 252/32.5 |
| 4,795,574 A | | 1/1989 | Syrinek et al. | 252/8.551 |
| 4,830,766 A | * | 5/1989 | Gallop et al. | 507/100 |
| 5,057,233 A | | 10/1991 | Huddleston | 252/8.551 |
| 5,110,485 A | | 5/1992 | Huddleston | 252/8.551 |
| 5,202,035 A | | 4/1993 | Huddleston | 252/8.551 |
| 5,417,287 A | | 5/1995 | Smith et al. | 166/308 |
| 5,419,183 A | | 5/1995 | Keys | 73/49.5 |
| 5,514,645 A | | 5/1996 | McCabe et al. | 507/238 |
| 5,571,315 A | | 11/1996 | Smith et al. | 106/285 |
| 5,614,010 A | | 3/1997 | Smith et al. | 106/285 |
| 5,622,919 A | | 4/1997 | Brezinski et al. | 507/90 |
| 5,647,900 A | | 7/1997 | Smith et al. | 106/285 |
| 5,649,596 A | | 7/1997 | Jones et al. | 166/300 |
| 5,674,817 A | * | 10/1997 | Brezinski et al. | 507/922 |
| 5,718,745 A | * | 2/1998 | Itoh et al. | 106/1.22 |
| 5,807,812 A | | 9/1998 | Smith et al. | 507/238 |
| 5,846,915 A | | 12/1998 | Smith et al. | 507/269 |
| 6,004,908 A | | 12/1999 | Graham et al. | 507/238 |
| 6,147,034 A | | 11/2000 | Jones et al. | 507/238 |
| 6,149,693 A | | 11/2000 | Geib | 44/270 |
| 6,187,720 B1 | * | 2/2001 | Acker et al. | 507/238 |
| 6,261,998 B1 | | 7/2001 | Amin et al. | 507/238 |

FOREIGN PATENT DOCUMENTS

| | | | | |
|---|---|---|---|---|
| EP | 0 599 474 A2 | 10/1993 | | E21B/43/26 |
| EP | 0 919 695 A2 | 11/1998 | | E21B/43/26 |
| WO | WO 97/27266 | 7/1997 | | |
| WO | WO 98/20088 | 5/1998 | | |
| WO | WO 98/45573 | 10/1998 | | |

* cited by examiner

*Primary Examiner*—Philip Tucker
(74) *Attorney, Agent, or Firm*—Robert A. Kent; C. Clark Dougherty, Jr.

(57) ABSTRACT

Improved methods and compositions for treating subterranean formations penetrated by well bores are provided. A method for breaking a gelled hydrocarbon fluid comprised of a hydrocarbon liquid, a ferric iron or aluminum polyvalent metal salt of a phosphonic or phosphoric acid ester is provided.

11 Claims, No Drawings

METHODS AND COMPOSITIONS FOR TREATING SUBTERRANEAN FORMATIONS WITH GELLED HYDROCARBON FLUIDS

BACKGROUND OF THE INVENTION

1. Field of the Invention

This invention relates to gelled liquid hydrocarbon fluids and methods of their use and preparation.

2. Description of the Prior Art

High viscosity gelled hydrocarbon liquids have heretofore been utilized in treating subterranean formations penetrated by well bores, e.g., hydraulic fracturing stimulation treatments. In such treatments, a high viscosity gelled liquid hydrocarbon fracturing fluid having particulate proppant material, e.g., sand, suspended therein is pumped through a well bore into a subterranean formation to be stimulated at a rate and pressure such that one or more fractures are formed and extended in the formation. The suspended proppant material is deposited in the fractures when the gelled hydrocarbon fracturing fluid is broken and returned to the surface. The proppant material functions to prevent the formed fractures from closing whereby conductive channels remain through which produced fluids can readily flow to the well bore.

Polyvalent metal salts of orthophosphoric acid esters have heretofore been utilized as gelling agents for forming high viscosity gelled liquid hydrocarbon fracturing fluids. Such gelled liquid hydrocarbon fracturing fluids have included fracture proppant material and delayed breakers for causing the fracturing fluids to break into relatively thin fluids whereby the proppant material is deposited in formed fractures and the fracturing fluid is produced back. Descriptions of such heretofore utilized high viscosity gelled liquid hydrocarbon fracturing fluids and methods of their use are set forth in U.S. Pat. No. 4,622,155 issued to Harris et al. on Nov. 11, 1986, and U.S. Pat. No. 5,846,915 issued to Smith et al. on Dec. 8, 1998. The gelled liquid hydrocarbon fracturing fluids described in the above patents utilize ferric iron or aluminum polyvalent metal salts of phosphoric acid esters as gelling agents and delayed breakers such as hard burned magnesium oxide which is slowly soluble in water.

While the heretofore utilized high viscosity gelled liquid hydrocarbon fracturing fluids and methods have been used successfully for forming fractures in subterranean formations, problems have been encountered as a result of the use of the gelling agent, i.e., the polyvalent metal salt of a phosphoric acid ester. That is, in recent years plugging of refinery towers which process oil produced from formations fractured with gelled liquid hydrocarbon fracturing fluids has caused many expensive, unplanned shut-downs. The plugging material is high in phosphorus and has been attributed to the phosphate esters used as gelling agents. The phosphate esters contribute volatile phosphorus which condenses on distillation tower trays, causing plugging. The volatile phosphorus may also carry over the tops of the distillation towers causing contamination of the hydrocarbon products produced.

Thus, there are needs for improved methods of using and preparing gelled liquid hydrocarbons which upon breaking and being refined substantially reduce volatile phosphorus in distillation towers, improved liquid hydrocarbon gelling agents and improved gelled liquid hydrocarbon compositions. More specifically, in fracturing oil producing subterranean formations in areas where volatile phosphorus is a problem in refineries, there is a need to reduce the production of volatile phosphorus in the refineries to levels where the above described unscheduled refinery shut downs are not required without compromising $CO_2$ compatibility with the gelled oil fracturing fluids used. Concentrations of $CO_2$ as high as 40–50% are commonly used in gelled oil fracturing fluids which form miscible mixtures with the fluids. The presence of the $CO_2$ enhances fluid recovery, minimizes the amount of oil based fracturing fluid which must be recovered, and reduces costs in areas where $CO_2$ is less expensive than the oil based fracturing fluid.

SUMMARY OF THE INVENTION

The present invention provides improved methods of using and preparing gelled liquid hydrocarbons, improved liquid hydrocarbon gelling agents and improved gelled liquid hydrocarbon compositions which meet the above described needs and overcome the deficiencies of the prior art.

The improved methods of this invention for fracturing subterranean formations using gelled liquid hydrocarbons are basically comprised of the following steps. An improved gelled liquid hydrocarbon fracturing fluid is prepared comprised of a hydrocarbon liquid, a gelling agent comprised of a ferric iron or aluminum polyvalent metal salt of a phosphonic acid ester, a proppant material, water and an amount of a delayed gel breaker effective to break the gelled hydrocarbon fracturing fluid. The phosphonic acid ester utilized in the gelling agent which minimizes volatile phosphorus in refinery distillation towers has the formula

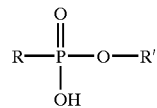

wherein R is an alkyl group having from about 8 to about 24 carbon atoms and R' is an alkyl group having from about 1 to about 4 carbon atoms. After the gelled liquid hydrocarbon fracturing fluid is prepared, the subterranean formation to be fractured is contacted with the gelled liquid hydrocarbon fracturing fluid under conditions effective to create at least one fracture in the subterranean formation.

The improved methods of this invention for preparing gelled liquid hydrocarbons basically comprise adding a phosphonic acid ester having the formula

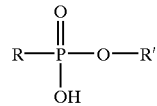

wherein R is an alkyl group having from about 8 to about 24 carbon atoms and R' is an alkyl group having from about 1 to about 4 carbon atoms, and preferably, at least a stoichiometric amount of a polyvalent metal source selected from ferric iron salts and aluminum compounds to a hydrocarbon liquid. The polyvalent metal source reacts with the phosphonic acid ester to form a ferric iron or aluminum polyvalent metal salt thereof. Water and an amount of a delayed gel breaker effective to break the gelled liquid hydrocarbon fracturing fluid is also added to the hydrocarbon liquid.

The improved liquid hydrocarbon gelling agents of this invention are comprised of a ferric iron or aluminum polyvalent metal salt of a phosphonic acid ester, the phosphonic acid ester having the formula

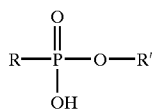

wherein R is an alkyl group having from about 8 to about 24 carbon atoms and R' is an alkyl group having from about 1 to about 4 carbon atoms.

The improved gelled liquid hydrocarbon compositions of this invention are comprised of a hydrocarbon liquid, a gelling agent comprising a polyvalent metal salt of a phosphonic acid ester produced from a phosphonic acid ester and a ferric iron salt or an aluminum compound, the phosphonic acid ester having the formula

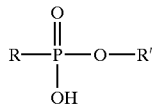

wherein R is an alkyl group having from about 8 to about 24 carbon atoms and R' is an alkyl group having from about 1 to about 4 carbon atoms, water and a delayed gel breaker present in an amount effective to break the gel formed by the gelling agent and the hydrocarbon liquid.

It is, therefore, an object of the present invention to provide improved methods and compositions useful in treating subterranean formations as well as in other similar applications.

Other and further objects, features and advantages of the present invention will be readily apparent to those skilled in the art upon a reading of the description of preferred embodiments which follows.

DESCRIPTION OF PREFERRED EMBODIMENTS

The present invention provides methods of treating subterranean formations penetrated by well bores with gelled liquid hydrocarbon fluids. For example, the gelled liquid hydrocarbon fluids are suitable for use in fracturing treatments carried out in subterranean formations whereby the production of hydrocarbons from the subterranean formations is stimulated. In accordance with the present invention, a fracturing fluid comprised of a gelled liquid hydrocarbon or mixture of hydrocarbons containing a proppant material and a delayed gel breaker is pumped through a well bore into a subterranean formation to be stimulated. The fracturing fluid is pumped at a rate and pressure such that one or more fractures are formed and extended in the subterranean formation. The proppant material which is suspended in the fracturing fluid is deposited in the fractures when the gel is broken and returned to the surface. The proppant material remains in the fractures and functions to prevent the fractures from closing whereby conductive channels are formed through which produced fluids can readily flow from the subterranean formation into the well bore.

As mentioned above, gelled liquid hydrocarbon fracturing fluids have heretofore been formed with a gelling agent comprised of a ferric iron or aluminum polyvalent metal salt of a phosphoric acid ester. The phosphoric acid ester suffers from the problem that it decomposes in refinery distillation towers to form volatile phosphorus which condenses on the trays of the distillation towers and causes plugging. Also, the phosphoric acid ester may itself be volatile, dependent upon its molecular weight. By the present invention, improved methods and compositions for fracturing subterranean formations with gelled liquid hydrocarbon fracturing fluids are provided wherein the gelling agent utilized is a ferric iron or aluminum polyvalent metal salt of a phosphonic acid ester. Unlike the phosphoric acid esters utilized heretofore, the phosphonic acid esters of the present invention have much higher thermal stability and consequently do not as readily decompose or disassociate.

Thus, the improved methods of fracturing subterranean formations of the present invention are basically comprised of the following steps. A gelled liquid hydrocarbon fracturing fluid is prepared comprised of a hydrocarbon liquid, a ferric iron or aluminum polyvalent metal salt of a phosphonic acid ester, a proppant material, water and an amount of a delayed gel breaker effective to break the gelled liquid hydrocarbon fracturing fluid. The phosphonic acid ester has the formula

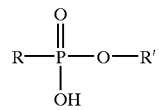

wherein R is an alkyl group having from about 8 to about 24 carbon atoms and R' is an alkyl group having from about 1 to about 4 carbon atoms. After the gelled liquid hydrocarbon fracturing fluid is prepared, the subterranean formation to be fractured is contacted with the fracturing fluid under conditions effective to create at least one fracture in the subterranean formation.

The hydrocarbon liquid utilized to form the gelled liquid hydrocarbon fracturing fluid can be any of the various previously used hydrocarbon liquids including, but not limited to, olefins, kerosene, diesel oil, gas oil (also known as gas condensate), fuel oil, other petroleum distillates, and certain mixtures of crude oil. Liquid hydrocarbon fracturing fluids which are specifically designed for use with $CO_2$ are generally preferred. Such a liquid hydrocarbon fracturing fluid is commercially available from the Trysol Corporation of Sundre, Alberta, Canada under the trade name "FRAC-SOL™."

As mentioned above, the gelling agent utilized for gelling the hydrocarbon liquid whereby it has a high viscosity sufficient to carry suspended proppant material and produce fractures in a subterranean formation is a ferric iron or aluminum polyvalent metal salt of a phosphonic acid ester having the formula set forth above. The polyvalent metal salt of the phosphonic acid ester is preferably produced at the well site by adding the phosphonic acid ester, and preferably, at least a stoichiometric amount of a polyvalent metal salt (preferably a ferric iron salt or an aluminum compound). In addition, if water is not already contained in the hydrocarbon liquid or added thereto as a component in a cross-linker solution or the like, water is added to the hydrocarbon liquid in an amount, for example, of about 0.05% or greater by weight of the hydrocarbon liquid. The presence of the water allows slowly water soluble or encapsulated breakers to be dissolved or released. See, for example, Smith et al. U.S. Pat. No. 5,846,915 issued on Dec. 8, 1995 which is incorporated herein by reference.

When a ferric iron salt is utilized to form the gelling agent, it is preferably selected from ferric sulfate or ferric chloride with ferric sulfate being preferred. The ferric iron salt is typically mixed with amines, surfactants and water to form a liquid cross-linking solution. An example of a commercially available ferric iron cross-linking solution is "EA-3™" cross-linking solution sold by Ethox Chemicals, Inc. of Greenville, S.C. When an aluminum compound is utilized, it is preferably selected from aluminum chloride or aluminum isopropoxide, with aluminum chloride being the most preferred. The polyvalent metal compound utilized reacts with the phosphonic acid ester to form the hydrocarbon liquid gelling agent of this invention which gels the hydrocarbon liquid. The phosphonic acid ester is added to the hydrocarbon liquid along with the polyvalent metal source to form the gelling agent in the hydrocarbon liquid in an amount in the range of from about 0.1% to about 2.5% by weight of the hydrocarbon liquid.

As mentioned above, the phosphonic acid ester which can be utilized to form the hydrocarbon liquid gelling agent of this invention has the formula

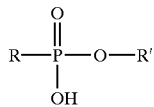

wherein R is an alkyl group having from about 8 to about 24 carbon atoms and R' is an alkyl group having from about 1 to about 4 carbon atoms. Techniques which can be utilized for the preparation of the phosphonic acid esters useful in accordance with this invention are, for example, described in U.S. Pat. No. 3,798,162 issued to Dickert, Jr. on Mar. 19, 1974 which is incorporated herein by reference.

Proppant materials which can be utilized in the fracturing fluids of this invention are well known in the art. For example, proppant materials such as graded sand, resin coated sand, sintered bauxite, various particulate ceramic materials, glass beads and the like can be utilized. The particular size of the proppant material employed depends on the particular formation being fractured and other variables. Generally, the proppant particle sizes are in the range of from about 2 to about 200 mesh on the U.S. Sieve Series scale.

A variety of delayed gel breakers can be utilized in accordance with the present invention to cause the gelled liquid hydrocarbon fracturing fluid to revert to a thin fluid that is produced back after fractures are formed in a subterranean formation. The gel breakers can be materials which are slowly soluble in water which, as mentioned above, is combined with or otherwise present in the hydrocarbon liquid. The breaking of the gel does not take place until the slowly soluble breakers are dissolved in the water. Examples of such slowly soluble breakers are given in U.S. Pat. No. 5,846,915 issued to Smith et al. on Dec. 8, 1998 which is incorporated herein by reference. As indicated in U.S. Pat. No. 5,846,915, hard burned magnesium oxide having a particle size which will pass through a 200 mesh Tyler screen is preferred. The hard burned magnesium oxide and other similar breakers are not immediately present for breaking the gel due to their slowly soluble nature. Other breakers such as alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials. Such materials are well known to those skilled in the art and function to delay the breaking of the gelled hydrocarbon liquid for a required period of time. Examples of water soluble and other similar encapsulating materials which can be utilized include, but are not limited to, porous solid materials such as precipitated silica, elastomers, polyvinylidene chloride (PVDC), nylon, waxes, polyurethanes, cross-linked partially hydrolyzed acrylics and the like. Of the slowly soluble or encapsulated breakers mentioned, hard burned magnesium oxide which is commercially available from Clearwater Inc. of Pittsburgh, Pa. is preferred for use in accordance with the present invention. When an alkaline breaker is utilized, e.g., magnesium oxide, the acid group of the phosphonic acid ester in the gelling agent is neutralized which initially increases the viscosity of the gelled hydrocarbon liquid after which the gel is broken.

Another type of breaker which can be utilized when the gelling agent is a ferric iron polyvalent metal salt of a phosphonic acid ester of this invention, or a ferric iron polyvalent metal salt of the heretofore used phosphoric acid ester, is a reducing agent that reduces ferric iron to ferrous iron. Since only ferric iron is capable of forming a viscous coordination complex with a phosphonic acid ester or a phosphoric acid ester, the complex can be disassociated by reducing the ferric iron to the ferrous state. The disassociation causes the gelled hydrocarbon liquid to break. Examples of reducing agents which can be utilized include, but are not limited to, stannous chloride, thioglycolic acid (2-mercaptoacetic acid), hydrazine sulfate, sodium diethyldithiocarbamate, sodium dimethyldithiocarbamate, sodium hypophosphite, potassium iodide, hydroxylamine hydrochloride, thioglycol (2-mercaptoethanol), ascorbic acid, sodium thiosulfate, sodium dithionite and sodium sulfite. Of these, the preferred reducing agents for use at a temperature of about 90° C. are stannous chloride, thioglycolic acid, hydrazine sulfate, sodium diethyldithiocarbamate and sodium dimethyldithiocarbamate. The most preferred reducing agent is thioglycolic acid which may be delayed by salt formation or encapsulation. As mentioned above in connection with other breakers that can be used, the reducing agent utilized can also be delayed by encapsulating it with a slowly water soluble or other similar encapsulating material.

The gel breaker utilized in a water-containing gelled liquid hydrocarbon fracturing fluid of this invention is generally present therein in an amount in the range of from about 0.01% to about 3% by weight of the hydrocarbon liquid, more preferably in an amount in the range of from about 0.05% to about 1%.

A preferred method of fracturing a subterranean formation in accordance with the present invention is comprised of the steps of: (a) preparing a gelled liquid hydrocarbon fracturing fluid comprised of a hydrocarbon liquid, a ferric iron or aluminum polyvalent metal salt of a phosphonic acid ester, the phosphonic acid ester having the formula

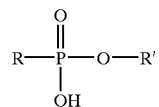

wherein R is an alkyl group having from about 8 to about 24 carbon atoms and R' is an alkyl group having from about 1 to about 4 carbon atoms, a proppant material, water and an amount of a delayed gel breaker effective to break the gelled hydrocarbon fracturing fluid; and (b) contacting the subterranean formation with the gelled hydrocarbon fracturing fluid under conditions effective to create at least one fracture in the subterranean formation.

The ferric iron or aluminum polyvalent metal salt of the phosphonic acid ester is present in the fracturing fluid in an amount in the range of from about 0.1% to about 2.5% by weight of the hydrocarbon liquid in the fracturing fluid, more preferably in an amount in the range of from about 0.2% to about 1%. The proppant material is present in the fracturing fluid in an amount in the range of from about 1 to about 14 pounds of proppant material per gallon of hydrocarbon liquid in the fracturing fluid. As mentioned, water is added to or otherwise contained in the hydrocarbon liquid so that the delayed gel breaker utilized is dissolved in the water. The delayed gel breaker is present in the fracturing fluid in an amount in the range of from about 0.01% to about 3% by weight of the hydrocarbon liquid in the fracturing fluid, more preferably in an amount in the range of from about 0.05% to about 1%.

A preferred method of preparing a gelled liquid hydrocarbon fluid of this invention is comprised of adding a phosphonic acid ester to a hydrocarbon liquid, the phosphonic acid ester having the formula

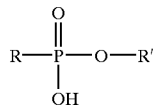

wherein R is an alkyl group having from about 8 to about 24 carbon atoms and R' is an alkyl group having from about 1 to about 4 carbon atoms, at least a stoichiometric amount of a polyvalent metal source selected from ferric iron salts and aluminum compounds which reacts with the phosphonic acid ester to form a ferric iron or aluminum polyvalent metal salt thereof, water and an amount of a delayed gel breaker effective to break the gelled hydrocarbon fracturing fluid.

The ferric iron or aluminum polyvalent metal salt of the phosphonic acid ester formed in the hydrocarbon liquid is present therein in an amount in the range of from about 0.1% to about 2.5% by weight of the hydrocarbon liquid, more preferably in an amount in the range of from about 0.2% to about 1%. The delayed gel breaker utilized is present in the hydrocarbon liquid in an amount in the range of from about 0.01% to about 3% by weight of the hydrocarbon liquid, more preferably in an amount in the range of from about 0.05% to about 1%.

A preferred hydrocarbon liquid gelling agent of this invention is comprised of a ferric iron or aluminum polyvalent metal salt of a phosphonic acid ester, the phosphonic acid ester having the formula

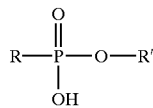

wherein R is an alkyl group having from about 8 to about 24 carbon atoms and R' is an alkyl group having from about 1 to about 4 carbon atoms.

A more preferred hydrocarbon liquid gelling agent is comprised of a ferric iron polyvalent metal salt of a phosphonic acid ester, the ester having the formula

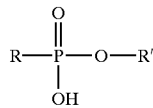

wherein R is an alkyl group having from about 14 to about 24 carbon atoms and R' is a methyl group.

A preferred gelled liquid hydrocarbon composition of this invention is comprised of: a hydrocarbon liquid; a gelling agent comprising a polyvalent metal salt of a phosphonic acid ester produced from a phosphonic acid ester and a ferric iron salt or an aluminum compound, the phosphonic acid ester having the formula

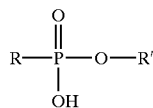

wherein R is an alkyl group having from about 14 to about 24 carbon atoms and R' is a methyl group, water and a delayed gel breaker present in an amount effective to break the gel formed by the gelling agent and the hydrocarbon liquid.

As mentioned above, the delayed gel breaker can be alkaline earth metal oxides including hard burned magnesium oxide, alkali metal carbonates, alkali metal bicarbonates, alkali metal acetates, alkali metal hydroxides, amines and weak acids which are slowly water soluble or are encapsulated with a slowly water soluble or other similar encapsulating material. The delayed gel breaker can also be a reducing agent that reduces ferric iron to ferrous iron encapsulated with a slowly water soluble or other similar encapsulating material. The delayed gel breaker is present in the gelled hydrocarbon liquid in an amount in the range of from about 0.01% to about 3% by weight of the hydrocarbon liquid, more preferably in an amount in the range of from about 0.05% to about 1%.

As will be understood by those skilled in the art, the use of the improved liquid hydrocarbon gelling agents and gelled liquid hydrocarbon compositions is not limited to fracturing subterranean formations. For example, the gelled liquid hydrocarbon compositions can be used for forming gravel packs in well bores, in pipeline pigging operations and in other operations where a gelled hydrocarbon liquid which subsequently breaks into a thin fluid is utilized.

In order to further illustrate the methods and composition of the present invention, the following examples are given.

EXAMPLE 1

A number of monoesters of alkylphosphonic acids were prepared in the laboratory as follows: solid dodecylphosphonic acid monomethyl ester, solid tetradecylphosphonic acid monomethyl ester, solid hexadecylphosphonic acid monomethyl ester, solid octadecylphosphonic acid monomethyl ester, solid $C_{20-24}$ phosphonic acid monomethyl ester, solid octadecylphosphonic acid monobutyl ester, liquid octylphosphonic acid monomethyl ester and liquid decylphosphonic acid monomethyl ester.

The following laboratory procedure was utilized in the preparation of the above listed esters. Alkylphosphonic acid dimethyl (or dibutyl) esters were first prepared by charging a 250 milliliter three necked round bottom flask with 0.2 mole of 1-alkene and 0.5 mole of dimethyl or dibutyl phosphite. The flask was fitted with a reflux condenser, thermometer, temperature controller, septum stopper and nitrogen purge. The mixture was magnetically stirred and heated to 150° C. or the boiling point of the 1-alkene, whichever was lower. 2.5 milliliters of t-butyl peroxide was slowly added with a syringe over the course of 1 hour. The mixture was heated at 150° C. for another 1.5 hours. The excess dialkyl phosphite was removed using vacuum distillation.

The following laboratory procedure was utilized in the preparation of monomethyl (or monobutyl) esters that are liquids at room temperature. That is, alkylphosphonic acid monomethyl (or monobutyl) esters were prepared using the alkylphosphonic acid dimethyl (or dibutyl) esters prepared in accordance with the above described procedure as follows. 0.045 mole of alkylphosphonic acid dimethyl (or dibutyl) ester was charged to a 100 milliliter round bottom flask. A solution of 1.9 grams (0.048 mole) of sodium hydroxide in 38 milliliters of methanol was added to the flask and the flask was fitted with a reflux condenser. The mixture was stirred magnetically and heated to reflux for 3 hours. 10 milliliters of water and 50 milliliters of hexane were added and the resulting mixture was shaken. The phases were separated and the hexane layer containing the unreacted dimethyl (or dibutyl) ester was discarded. The aqueous layer was washed twice with 20 milliliter portions of hexane and the hexane layer was discarded. 3.6 milliliters of 38% hydrochloric acid (0.045 mole) was added to the aqueous phase followed by 40 milliliters of water. The mixture was extracted 3 times with 20 milliliter portions of hexane. The combined organic fractions were washed with water and dried over anhydrous magnesium sulfate. The solvent was removed using a rotary evaporator. The alkylphosphonic acid monomethyl (or monobutyl) esters produced were liquids at room temperature.

Alkylphosphonic acid monoesters which are solids at room temperature were also prepared. These were the C12 to C24 alkyl phosphonic acid mono methyl esters. The following laboratory procedure was utilized. A 100 milliliters round bottom flask was charged with 0.05 mole of alkylphosphonic acid dimethyl ester and the flask was warmed to melt the solid. A solution of 2.5 g (0.063 mole) of sodium hydroxide in 38 milliliters of methanol was added and the flask was fitted with a reflux condenser. The mixture was stirred magnetically and heated to reflux for 3 hours. The flask was cooled and 5 milliliters 38% hydrochloric acid (0.062 mole) was added, followed by the addition of 125 milliliters of water. The slurry was extracted into hexane. The hexane solution was washed with water, dried over anhydrous magnesium sulfate, and concentrated on a rotary evaporator. The product was allowed to recrystallize, then it was collected on a büchner funnel, washed with hexane, and air dried.

EXAMPLE 2

A commercially available octylphosphonic acid monomethyl ester was obtained which contained 55–65% octylphosphonic acid monomethyl ester, 20–30% octylphosphonic acid and 10–20% octylphosphonic acid dimethyl ester. 2 milliliters of the commercial octylphosphonic acid monomethyl ester and 2 milliliters of a ferric iron cross-linker commercially available from Clearwater Inc. of Pittsburgh, Pa. under the trade designation "HGA-65™" were added to 200 milliliters of kerosene. Initial cross-linking was observed after 20 seconds of stirring with an overhead stirrer. A strong cross-linked gel was observed after 1 minute.

This test shows that the phosphonic acid ester does not have to be pure, i.e., it can contain portions of the phosphonic acid and the phosphonic acid dialkyl ester.

EXAMPLE 3

2 milliliters of the commercially available octylphosphonic acid monomethyl ester described in Example 2 were added to 200 milliliters of kerosene along with a ferric iron cross-linker composition. The ferric iron cross-linker composition was comprised of 240 grams of deionized water, 60 grams of ferric sulfate pentahydrate and 33.3 grams of triethanolamine.

Upon mixing, the cross-linking reaction was slower than that observed in Example 2, but good cross-linking was observed after 2 to 3 minutes.

EXAMPLE 4

The commercially available octylphosphonic acid monomethyl ester described in Example 2 was added to No. 2 off-road diesel oil along with a commercially available ferric iron cross-linking composition obtained from Ethox Chemicals, Inc. of Greenville, S.C. sold under the trade designation "EA-3™" (see U.S. Pat. No. 6,149,693 issued to Geib on Nov. 21, 2000). Three different mixtures were prepared having the quantities of components shown in Table I below. After mixing, each of the mixtures was placed in a Model 50 viscometer at 68° C. and the viscosities of the mixtures were observed over time. The results of these tests are given in Table I below.

TABLE I

Viscosities Of Gelled Diesel Oil Using Commercially Available Gelling Agent Components At 68° C.

| Time, minutes | Viscosity, cp. @ 170/sec | | |
|---|---|---|---|
| | Mixture A[1] | Mixture B[2] | Mixture C[3] |
| 30 | 297 | 169 | 197 |
| 60 | 243 | 172 | 210 |
| 90 | 218 | 187 | 212 |
| 120 | 205 | 209 | 204 |
| 150 | 193 | 217 | 199 |
| 180 | 184 | 218 | 193 |
| 210 | 175 | 218 | 188 |
| 240 | 167 | 217 | 184 |
| 270 | 158 | 216 | 182 |
| 300 | 152 | 217 | — |

[1]Mixture A was comprised of 6 milliliters of commercially available Albright & Wilson "ITC ™-996," octylphosphonic acid monomethyl ester per liter of diesel oil and 5 milliliters of "ETHOX ™ EA-3" ferric iron cross-linker composition per liter of diesel oil.
[2]Mixture B was comprised of 5 milliliters of commercially available Albright & Wilson "ITC ™-996," octylphosphonic acid monomethyl ester per liter of diesel oil and 5 milliliters of "ETHOX ™ EA-3" ferric iron cross-linker composition per liter of diesel oil.
[3]Mixture C was comprised of 5 milliliters of commercially available Albright & Wilson "ITC ™-996," octylphosphonic acid monomethyl ester per liter of diesel oil and 6 milliliters of "ETHOX ™ EA-3" ferric iron cross-linker composition per liter of diesel oil.

From Table I it can be seen that the commercially available octylphosphonic acid monomethyl ester and cross-linker produced rapid cross-linking and excellent viscosities.

EXAMPLE 5

The procedure of Example 4 was repeated except that the octylphosphonic acid monomethyl ester was synthesized in accordance with the procedure set forth in Example 1 and the third mixture tested, i.e., mixture F, included magnesium oxide breaker. The results of these tests are given in Table II below.

TABLE II

Viscosities Of Gelled Diesel Oil Using Synthesized Octylphosphonic Acid Monomethyl Ester And Commercial Ferric Iron Cross-Linking Composition At 68° C.

| Time, minutes | Viscosity, cp. @ 170/sec | | |
|---|---|---|---|
| | Mixture D[1] | Mixture E[2] | Mixture F[3] |
| 4 | 299 | 388 | 395 |
| 30 | 131 | 143 | 85 |
| 60 | 135 | 146 | 47 |
| 90 | 140 | 151 | 34 |
| 120 | 146 | 156 | 25 |
| 150 | 149 | 160 | 17 |
| 180 | — | 162 | 10 |
| 210 | — | 163 | — |
| 240 | — | 164 | — |

[1]Mixture D was comprised of 5 milliliters of synthesized octylphosphonic acid monomethyl ester per liter of diesel oil and 5 milliliters of "ETHOX ™ EA-3" ferric iron cross-linker composition per liter of diesel oil.
[2]Mixture E was comprised of 5 milliliters of synthesized octylphosphonic acid monomethyl ester per liter of diesel oil and 6 milliliters of "ETHOX ™ EA-3" ferric iron cross-linker composition per liter of diesel oil.
[3]Mixture F was comprised of 5 milliliters of synthesized octylphosphonic acid monomethyl ester per liter of diesel oil, 5 milliliters of "ETHOX ™ EA-3" ferric iron cross-linker composition per liter of diesel oil and 1.2 grams magnesium oxide breaker per liter of diesel oil.

From Table II it can be seen that the synthesized octylphosphonic acid monomethyl ester produced excellent gels. In addition, mixture F including magnesium oxide gel breaker showed an increased viscosity as a result of neutralization of the phosphonic acid ester by the magnesium oxide breaker therein after which the gel was broken.

EXAMPLE 6

The procedure of Example 4 was repeated except that the phosphonic acid ester used was synthesized hexadecylphosphonic acid monomethyl ester. The results of these tests are given in Table III set forth below.

TABLE III

Viscosities Of Gelled Diesel Oil Using Synthesized Hexadecylphosphonic Acid Monomethyl Ester And Commercial Ferric Iron Cross-Linking Composition at 68° C.

| Time, minutes | Viscosity, cp. @ 170/sec | | | | | | | |
|---|---|---|---|---|---|---|---|---|
| | Mixture G[1] | Mixture H[2] | Mixture I[3] | Mixture J[4] | Mixture K[5] | Mixture L[6] | Mixture M[7] | Mixture N[8] |
| 3.5 | 36 | 121 | 70 | 162 | 107 | 179 | 235 | 292 |
| 30 | 145 | 199 | 190 | 183 | 165 | 177 | 175 | 186 |
| 60 | 171 | 176 | 169 | 195 | 166 | 187 | 172 | 181 |
| 90 | 177 | 186 | 169 | 208 | 167 | 192 | 173 | 177 |
| 120 | 187 | 197 | 175 | 213 | 169 | 194 | 174 | 172 |
| 150 | 189 | 203 | 179 | 218 | 175 | 200 | 178 | 176 |
| 180 | 191 | 209 | 189 | 221 | 181 | 202 | 178 | 174 |
| 195 | 193 | 209 | 190 | 222 | 181 | 203 | 181 | 174 |

[1]Mixture G was comprised of 0.02 M (6.4 g/L) synthesized hexadecylphosphonic acid monomethyl ester per liter of diesel oil and 4.0 milliliters of "ETHOX ™ EA-3" ferric iron cross-linker composition per liter of diesel oil.
[2]Mixture H was comprised of 0.02 M (6.4 g/L) synthesized hexadecylphosphonic acid monomethyl ester per liter of diesel oil and 5.0 milliliters of "ETHOX ™ EA-3" ferric iron cross-linker composition per liter of diesel oil.
[3]Mixture I was comprised of 0.02 M (6.4 g/L) synthesized hexadecylphosphonic acid monomethyl ester per liter of diesel oil and 5.5 milliliters of "ETHOX ™ EA-3" ferric iron cross-linker composition per liter of diesel oil.
[4]Mixture J was comprised of 0.02 M (6.4 g/L) synthesized hexadecylphosphonic acid monomethyl ester per liter of diesel oil and 6.0 milliliters of "ETHOX ™ EA-3" ferric iron cross-linker composition per liter of diesel oil.
[5]Mixture K was comprised of 0.02 M (6.4 g/L) synthesized hexadecylphosphonic acid monomethyl ester per liter of diesel oil and 6.5 milliliters of "ETHOX ™ EA-3" ferric iron cross-linker composition per liter of diesel oil.
[6]Mixture L was comprised of 0.02 M (6.4 g/L) synthesized hexadecylphosphonic acid monomethyl ester per liter of diesel oil and 7.0 milliliters of "ETHOX ™ EA-3" ferric iron cross-linker composition per liter of diesel oil.
[7]Mixture M was comprised of 0.02 M (6.4 g/L) synthesized hexadecylphosphonic acid monomethyl ester per liter of diesel oil and 9.0 milliliters of "ETHOX ™ EA-3" ferric iron cross-linker composition per liter of diesel oil.
[8]Mixture N was comprised of 0.02 M (6.4 g/L) synthesized hexadecylphosphonic acid monomethyl ester per liter of diesel oil and 11.0 milliliters of "ETHOX ™ EA-3" ferric iron cross-linker composition per liter of diesel oil.

From Table III it can be seen that synthesized hexadecylphosphonic acid monomethyl ester and the ferric iron cross-linker utilized form excellent gels in diesel oil at 68° C.

EXAMPLE 7

The test procedure of Example 4 was repeated except that synthesized octadecylphosphonic acid monomethyl ester was utilized, the temperature of the gelled diesel oil was increased over time and two of the four gelled mixtures tested contained a magnesium oxide breaker. The results of these tests are given in Table IV below.

TABLE IV

Viscosities Of Gelled Diesel Oil Using Synthesized Octadecylphosphonic Acid Monomethyl Ester And Commercial Ferric Iron Cross-Linking Composition At Various Temperatures

| | Mixture O[1] | | Mixture P[2] | | Mixture Q[3] | | Mixture R[4] | |
|---|---|---|---|---|---|---|---|---|
| Time, minutes | Temp., ° C. | Viscosity, cp. @ 170/sec | Temp., ° C. | Viscosity, cp. @ 170/sec | Temp., ° C. | Viscosity, cp. @ 170/sec | Temp., ° C. | Viscosity, cp. @ 170/sec |
| 0 | 33 | 236 | 32 | 165 | 26 | 210 | 27 | 260 |
| 30 | 66 | 243 | 66 | 200 | 67 | 245 | 55 | 295 |
| 60 | 67 | 247 | 68 | 220 | 68 | 250 | 88 | 320 |
| 90 | 67 | 247 | 68 | 222 | 68 | 253 | 117 | 355 |

TABLE IV-continued

Viscosities Of Gelled Diesel Oil Using
Synthesized Octadecylphosphonic Acid Monomethyl Ester And
Commercial Ferric Iron Cross-Linking Composition At Various Temperatures

| | Mixture O[1] | | Mixture P[2] | | Mixture Q[3] | | Mixture R[4] | |
|---|---|---|---|---|---|---|---|---|
| Time, minutes | Temp., °C. | Viscosity, cp. @ 170/sec | Temp., °C. | Viscosity, cp. @ 170/sec | Temp., °C. | Viscosity, cp. @ 170/sec | Temp., °C. | Viscosity, cp. @ 170/sec |
| 120 | 67 | 247 | 68 | 227 | 68 | 255 | 141 | 375 |
| 150 | 86 | 254 | 85 | 265 | 86 | 280 | 145 | 390 |
| 180 | 132 | 44 | 129 | 60 | 131 | 45 | 152 | 310 |
| 210 | 145 | 37 | 145 | 42 | 145 | 35 | 162 | 150 |
| 240 | 146 | 36 | 146 | 42 | 146 | 32 | 173 | 27 |
| 270 | — | — | — | — | — | — | 174 | 16 |
| 300 | — | — | — | — | — | — | 183 | 15 |
| 330 | — | — | — | — | — | — | 193 | 14 |

[1]Mixture O was comprised of 0.02 M (7 g/L) synthesized octadecylphosphonic acid monomethyl ester per liter of diesel oil and 5 milliliters of "ETHOX ™ EA-3" ferric iron cross-linker composition per liter of diesel oil.
[2]Mixture P was comprised of 0.02 M (7 g/L) synthesized octadecylphosphonic acid monomethyl ester per liter of diesel oil and 5 milliliters of "ETHOX ™ EA-3" ferric iron cross-linker composition per liter of diesel oil and 0.24 grams of magnesium oxide breaker per liter of diesel oil.
[3]Mixture Q was comprised of 0.02 M (7 g/L) synthesized octadecylphosphonic acid monomethyl ester per liter of diesel oil and 6 milliliters of "ETHOX ™ EA-3" ferric iron cross-linker composition per liter of diesel oil.
[4]Mixture R was comprised of 0.04 M (14 g/L) synthesized octadecylphosphonic acid monomethyl ester per liter of diesel oil, and 12 milliliters of "ETHOX ™ EA-3" ferric iron cross-linker composition per liter of diesel oil and 0.48 grams of magnesium oxide breaker per liter of diesel oil.

As can be seen from Table IV, synthesized octadecylphosphonic acid monomethyl ester and the ferric iron cross-linker utilized form excellent gels in diesel oil over a broad temperature range. Further, the magnesium oxide breaker neutralized the acid ester which increased the viscosity attained over a broad range of temperatures.

EXAMPLE 8

The test procedure of Example 4 was repeated except that a Tempco Rheo-15 rheometer was utilized to measure apparent viscosities at various temperatures with fluids containing 40% $CO_2$ by volume. One of the test mixtures was formed with a #2 Off Road Diesel hydrocarbon fluid and another test mixture included magnesium oxide. The results of these tests are set forth in Table V below.

TABLE V

Viscosities Of Gelled Diesel Using
Commercially Available Gelling Agent Components
And 40% Carbon Dioxide By Volume At Various Temperatures

| | Mixture S[1] | | Mixture T[2] | | Mixture U[3] | |
|---|---|---|---|---|---|---|
| Time, minutes | Temp., °C. | Viscosity, cp. @ 170/sec | Temp., °C. | Viscosity, cp. @ 170/sec | Temp., °C. | Viscosity, cp. @ 170/sec |
| 0 | 10 | 120 | 7 | 120 | 7 | 100 |
| 10 | 66 | 155 | 52 | 195 | 60 | 295 |
| 20 | 85 | 115 | 66 | 205 | 63 | 330 |
| 30 | 85 | 95 | 68 | 195 | 66 | 340 |
| 40 | 85 | 85 | 71 | 190 | 68 | 345 |
| 50 | 85 | 85 | 74 | 175 | 71 | 350 |
| 60 | 85 | 85 | 77 | 165 | 72 | 350 |
| 70 | — | — | 82 | 145 | 74 | 340 |
| 80 | — | — | 85 | 130 | 77 | 335 |
| 90 | — | — | 88 | 110 | 79 | 320 |
| 100 | — | — | 91 | 90 | 85 | 315 |
| 110 | — | — | 93 | 80 | 88 | 300 |
| 120 | — | — | 96 | 65 | 90 | 285 |
| 130 | — | — | 99 | 45 | 91 | 265 |

TABLE V-continued

Viscosities Of Gelled Diesel Using
Commercially Available Gelling Agent Components
And 40% Carbon Dioxide By Volume At Various Temperatures

| Time, minutes | Mixture S[1] | | Mixture T[2] | | Mixture U[3] | |
|---|---|---|---|---|---|---|
| | Temp., °C. | Viscosity, cp. @ 170/sec | Temp., °C. | Viscosity, cp. @ 170/sec | Temp., °C. | Viscosity, cp. @ 170/sec |
| 140 | — | — | 102 | 35 | 93 | 240 |
| 150 | — | — | 104 | 20 | 96 | 210 |

[1]Mixture S was comprised of 5 milliliters of commercially available Albright & Wilson "ITC ™-966" octylphosphonic acid monomethyl ester per liter of #2 Off Road Diesel Fuel containing 40% by volume carbon dioxide and 5 milliliters of Ethox "EA-3 ™" ferric iron cross-linker composition per liter of #2 Off Road Diesel Fuel containing 40% by volume carbon dioxide.
[2]Mixture T was comprised of 7 milliliters of commercially available Albright & Wilson "ITC ™-966" octylphosphonic acid monomethyl ester per liter of diesel oil containing 40% by volume carbon dioxide and 7 milliliters of Ethox "EA-3 ™" ferric iron cross-linker composition per liter of diesel oil containing 40% by volume carbon dioxide.
[3]Mixture U was comprised of 7 milliliters of commercially available Albright & Wilson "ITC ™-966" octylphosphonic acid monomethyl ester per liter of #2 Off Road Diesel Fuel containing 40% by volume carbon dioxide, 7 milliliters of Ethox "EA-3 ™" ferric iron cross-linker composition per liter of #2 Off Road Diesel Fuel containing 40% by volume carbon dioxide and 0.240 grams of magnesium oxide breaker per liter of diesel oil containing 40% by volume carbon dioxide.

From Table V it can be seen that excellent gels were formed even though the gels contained 40% by volume carbon dioxide. Also, a significant increase in viscosity was realized when the gel included only enough magnesium oxide breaker to partially neutralize the octyl phosphonic acid monomethyl ester.

EXAMPLE 9

Various synthesized phosphonic acid esters were added in various amounts to diesel oil or kerosene along with various amounts of ETHOX "EA-3™" ferric iron cross-linker compositions and the resulting gels were observed. The results of these tests are set forth in Table VI below.

EXAMPLE 10

The procedure described in Example 4 was repeated except that magnesium oxide breaker was included in the three mixtures that were tested. In addition, one of the gels was produced utilizing a hydrocarbon liquid commercially available from Trisol Corp. of Sundre, Alberta, Canada under the trade name "FRACSOL™" to which was added 40% by total volume carbon dioxide. The results of the tests are given in VII below.

TABLE VI

Observations Of Various Gels
Formed With Alkylphosphonic Acid
Monomethyl Esters And Commercial Cross-Linkers

| Hydrocarbon Liquid Used | Ester | Ester Amount In Hydro-carbon Liquid | Cross-Linker | Cross-Linker Amount, ml/L of hydrocarbon liquid | Observations |
|---|---|---|---|---|---|
| Off-road Diesel | Octylphosphonic acid monomethyl ester | 2.0 ml/L | Ethox "EA-3 ™" | 2 | weak elastic gel |
| Off-road Diesel | Octylphosphonic acid monomethyl ester | 33.0 ml/L | Ethox "EA-3 ™" | 3 | weak lipping gel |
| Off-road Diesel | Octylphosphonic acid monomethyl ester | 5.0 ml/L | Ethox "EA-3 ™" | 5 | strong lipping gel |
| Off-road Diesel | Decylphosphonic acid monomethyl ester | 5.0 ml/L | Ethox "EA-3 ™" | 10 | weak elastic gel |
| Off-road Diesel | Decylphosphonic acid monomethyl ester | 10.0 ml/L | Ethox "EA-3 ™" | 5 | lipping gel |
| Kerosene | Hexadecylphosphonic acid monomethyl ester | 9.9 g/L | Ethox "EA-3 ™" | 10 | very strong lipping gel |
| Kerosene | Octadecylphosphonic acid monobutyl ester | 8.0 g/L | Ethox "EA-3 ™" | 6 | very strong lipping gel |
| Kerosene | Octylphosphonic acid monomethyl ester[1] | 10.0 ml/L | Aluminum compound[2] | 0.8 | good lipping gel |

[1]Albert & Wilson "ITC-966 ™" ester
[2]Aluminum cross-linker commercially available from Halliburton Energy Services, Inc. of Duncan, Oklahoma.

TABLE VII

Break Times Of Various Gels With Magnesium Oxide

| | Mixture V[1] | | Mixture W[2] | | Mixture X[3] | |
|---|---|---|---|---|---|---|
| Time, minutes | Temp., °C. | Viscosity, cp. @ 170/sec | Temp., °C. | Viscosity, cp. @ 170/sec | Temp., °C. | Viscosity, cp. @ 170/sec |
| 5 | 31 | 366 | 33 | 375 | 39 | 370 |
| 10 | 46 | 365 | 48 | 307 | 68 | 365 |
| 15 | 54 | 365 | 55 | 240 | 85 | 360 |
| 20 | 59 | 364 | 58 | 173 | 85 | 200 |
| 25 | 62 | 363 | 61 | 105 | 85 | 70 |
| 30 | 64 | 360 | 62 | 83 | 85 | 30 |
| 35 | 65 | 357 | 64 | 76 | 85 | 15 |
| 40 | 66 | 353 | 65 | 67 | 85 | 13 |
| 45 | 67 | 335 | 65 | 62 | 85 | 10 |
| 50 | 67 | 318 | 66 | 56 | 85 | 9 |
| 55 | 67 | 302 | 66 | 51 | 85 | 5 |
| 60 | 68 | 293 | 66 | 47 | 85 | 2 |
| 90 | 68 | 185 | 66 | 34 | | |
| 120 | 68 | 97 | 67 | 25 | | |
| 150 | 68 | 74 | 67 | 17 | | |
| 180 | 68 | 67 | 67 | 11 | | |
| 210 | 68 | 60 | | | | |
| 240 | 68 | 54 | | | | |
| 270 | 68 | 47 | | | | |
| 300 | 68 | 35 | | | | |
| 330 | 68 | 25 | | | | |
| 360 | 68 | 18 | | | | |
| 390 | 68 | 14 | | | | |
| 420 | 68 | 12 | | | | |

[1]Mixture V was comprised of 5 milliliters of commercially available Albright & Wilson "ITC ™-966" octylphosphonic acid monomethyl ester per liter of off-road diesel oil, 5 milliliters of Ethox "EA-3 ™" ferric iron cross-linker composition per liter of off-road diesel oil and 2.4 grams of magnesium oxide breaker per liter of off-road diesel oil. The off-road diesel oil contained water.
[2]Mixture W was comprised of 5 milliliters of synthesized octylphosphonic acid monomethyl ester per liter of off-road diesel oil, 5 milliliters of Ethox "EA-3 ™" ferric iron cross-linker composition per liter of off-road diesel oil and 1.2 grams of magnesium oxide breaker per liter of off-road diesel oil. The off-road diesel oil contained water.
[3]Mixture X was comprised of 7 milliliters of commercially available Albright & Wilson "ITC ™-966" octylphosphonic acid monomethyl ester per liter of "FRACSOL ™" hydrocarbon liquid mixed with 40% by volume carbon dioxide, 7 milliliters of Ethox "EA-3 ™" ferric iron cross-linker composition per liter of "FRACSOL ™" hydrocarbon liquid mixed with 40% by volume carbon dioxide and 1.1 grams of magnesium oxide breaker per liter of "FRACSOL ™" hydrocarbon liquid mixed with 40% by volume carbon dioxide. Mixture X also contained water.

From Table VII, it can be seen that complete progressive breaks were obtained by the presence of the magnesium oxide. The synthesized phosphonic acid ester required significantly less breaker and still showed a faster break rate than the commercial phosphonic acid ester. The gel containing 60% by volume "FRACSOL™" hydrocarbon liquid and 40% by volume carbon dioxide also achieved a progressive and complete break as a result of the presence of the magnesium oxide.

EXAMPLE 11

Gelled hydrocarbon liquid test samples were prepared by combining 0.02M (6.4 g/L) of hexadecylphosphonic acid monomethyl ester and 5 milliliters of ethox "EA-3™" ferric iron cross-linker composition to 1 liter of off-road diesel oil. Various reducing agents for reducing ferric iron to ferrous iron and thereby breaking the gels were added to the test samples. Thereafter, the viscosities of the test samples over time were measured to determine the effectiveness of the reducing agents in breaking the gels. The results of these tests are given in Table VIII below.

TABLE VIII

Break Times Of Diesel Oil Gel[1] Containing Various Reducing Agents @ 90° C.

| Reducing Agent Used | Viscosity, cp. @ 170/sec At Time | | | | |
|---|---|---|---|---|---|
| | 0 | 2 hrs. | 21 hrs. | 45 hrs. | 242 hrs. |
| Blank-No Reducing Agent | 60 | 66 | 66 | 66 | 66 |
| Stannous Chloride dihydrate | 7 | 3 | — | — | — |
| Thioglycolic Acid | 45 | 3 | — | — | — |
| Sodium Diethyldithiocarbamate | 141 | 18 | 3 | — | — |
| Sodium Dimethyldithiocarbamate | 123 | 42 | 30 | 3 | — |
| Hydrazine Sulfate | 45 | 96 | 57 | 33 | 3 |
| Hydroxylamine Hydrochloride | 75 | 69 | 15 | 3 | — |

TABLE VIII-continued

Break Times Of Diesel Oil Gel[1]
Containing Various Reducing Agents @ 90° C.

| Reducing Agent Used | Viscosity, cp. @ 170/sec At Time | | | | |
|---|---|---|---|---|---|
| | 0 | 2 hrs. | 21 hrs. | 45 hrs. | 242 hrs. |

[1]0.02M (0.64 wt %) hexadecyl phosphonic acid mono methyl ester per liter of off-road diesel oil, 5 milliliters of Ethox "EA-3 ™" ferric iron cross-linker composition per liter of off-road diesel oil and 0.01 M reducing agent per liter of off-road diesel oil. [0.1 Molar for stannous chloride dihydrate = 22.56 g/L; 0.1 M for thioglycolic acid (mercaptoacetic acid) = 9.21 g/L; 0.1 M for sodium diethyldithiocarbamate = 22.53 g/L; 0.1 M for sodium dimethyldithiocarbamate = 14.32 g/L; 0.1 m hydroxylamine hydrochloride = 6.95 g/L] The off-road diesel oil gels contained water.

From Table VIII it can be seen that reducing agents comprised of stannous chloride, thioglycolic acid, sodium diethyldithiocarbamate, sodium dimethyldithiocarbamate and hydrazine sulfate can be utilized as efficient reducing agent breakers for the hydrocarbon gels of this invention, at 90° C.

Additional reducing agents were evaluated but found to be too weak with phosphonates gels, at 90° C. However, it is understood the additional reducing agents could be the preferred reducing agents at higher temperatures where a slower rate of reaction is required. The additional reducing agents include, but are not limited to, sodium hypophosphite, potassium iodide, 2-mercaptoethanol (thioglycol), ascorbic acid, sodium thiosulfate, sodium dithionite, sodium sulfite and salts thereof.

EXAMPLE 12

Various alkylphosphonic acid monomethyl esters were dissolved in a high boiling point mineral oil in amounts such that 0.1 M solutions were formed. The solutions were each distilled in accordance with ASTM D-86 and the distillates obtained were analyzed for phosphorus by Inductively Coupled Plasma methodology (ASTM D-4951). The results of these tests are given in Table IX.

TABLE IX

Volatile Phosphorus Formed From Distillation Of
Alkylphosphonic Acid Monomethyl Esters In Mineral Oil

| Ester | Phosphorus in Distillate, ppm |
|---|---|
| octylphosphonic acid monomethyl ester | 148 |
| decylphosphonic acid monomethyl ester | 38 |
| dodecylphosphonic acid monomethyl ester | 12 |
| tetradecylphosphonic acid monomethyl ester | 6 |
| hexadecylphosphonic acid monomethyl ester | 5 |
| octadecylphosphonic acid monomethyl ester | 3 |
| $C_{20-24}$ alkanephosphonic acid monomethyl ester | <1 |

Table IX shows a clear trend in which the volatile phosphorus produced by the alkyl-phosphonic acid monomethyl esters is a function of molecular weight. Tetradecylphosphonic acid monomethyl ester shows a 96% reduction in volatile phosphorus over the octylphosphonic acid monomethyl ester. The fact that the $C_{20-24}$ alkylphosphonic acid monomethyl ester had no detectable volatile phosphorus shows that decomposition due to hydrolysis has been eliminated under the test conditions.

From Table IX it is apparent the alkylphosphonic acid monomethyl esters of C14 (tetradecyl) or higher are preferred to minimize volatile phosphorus. Of these, tetradecylphosphonic acid monomethyl ester is most preferred to reduce volatile phosphorus while retaining good solubility properties at room temperature.

Thus, the present invention is well adapted to carry out the objects and attain the benefits and advantages mentioned as well as those which are inherent therein. While numerous changes to the methods and compositions can be made by those skilled in the art, such changes are encompassed within the spirit of this invention as defined by the appended claims.

What is claimed is:

1. In a liquid hydrocarbon gel comprised of a hydrocarbon liquid, a ferric iron polyvalent metal salt of a phosphoric acid ester, water and an additive for breaking said gel into a thin fluid, the improvement which comprises:

said additive for breaking said gel being a water soluble reducing agent which upon dissolving in said water and contacting said liquid hydrocarbon gel reduces said ferric iron in the gel to ferrous iron.

2. The gel of claim 1 wherein said reducing agent is selected from the group consisting of stannous chloride, thioglycolic acid and its salts, hydrazine sulfate, sodium diethyldithiocarbamate, sodium dimethyldithiocarbamate, sodium hydrophosphite, potassium iodide, hydroxylamine hydrochloride, thioglycol, ascorbic acid and its salts, sodium thiosulfate, sodium dithionite, and sodium sulfite.

3. The gel of claim 1 wherein said reducing agent is thioglycolic acid and its salts.

4. The gel of claim 1 wherein said reducing agent is stannous chloride.

5. The gel of claim 1 wherein said reducing agent is hydrazine sulfate.

6. The gel of claim 1 wherein said reducing agent is sodium hypophosphite.

7. The gel of claim 1 wherein said reducing agent is potassium iodide.

8. The gel of claim 1 wherein the water solubility of said reducing agent is delayed by encapsulating said reducing agent with a slowly water soluble material.

9. The gel of claim 1 wherein said reducing agent is thioglycolic acid and the water solubility of said thioglycolic acid is delayed by forming it into a slowly water soluble salt.

10. The gel of claim 1 wherein said hydrocarbon liquid is selected from the group consisting of olefins, kerosene, diesel oil, gas oil, fuel oil, petroleum distillate, and crude oil.

11. The gel of claim 1 wherein said additive is present in said gel in an amount in the range of from about 0.01% to about 3% by weight of hydrocarbon liquid in said gel.

* * * * *